United States Patent
Renken et al.

(10) Patent No.: US 7,497,134 B2
(45) Date of Patent: Mar. 3, 2009

(54) PROCESS CONDITION MEASURING DEVICE AND METHOD FOR MEASURING SHEAR FORCE ON A SURFACE OF A SUBSTRATE THAT UNDERGOES A POLISHING OR PLANARIZATION PROCESS

(75) Inventors: Wayne G. Renken, San Jose, CA (US);
Mei H. Sun, Los Altos, CA (US); Aron Abramowski Mason, San Mateo, CA (US)

(73) Assignee: KLA-Tencor Corporation, San Jose, CA (US)

( * ) Notice: Subject to any disclaimer, the term of this patent is extended or adjusted under 35 U.S.C. 154(b) by 0 days.

(21) Appl. No.: 11/861,207

(22) Filed: Sep. 25, 2007

(65) Prior Publication Data

US 2008/0087105 A1    Apr. 17, 2008

Related U.S. Application Data

(60) Provisional application No. 60/828,351, filed on Oct. 5, 2006, provisional application No. 60/828,000, filed on Oct. 3, 2006.

(51) Int. Cl.
  *G01L 1/16* (2006.01)
(52) U.S. Cl. ................................... 73/862.68
(58) Field of Classification Search ................................ 73/862.391–862.68
  See application file for complete search history.

(56) References Cited

U.S. PATENT DOCUMENTS

| 5,720,845 | A * | 2/1998 | Liu ................... 156/345.13 |
| 6,129,613 | A | 10/2000 | Bothra .................. 451/66 |
| 6,186,865 | B1 * | 2/2001 | Thornton et al. ............ 451/8 |
| 6,337,271 | B1 * | 1/2002 | Takahashi ............... 438/650 |
| 6,520,834 | B1 * | 2/2003 | Marshall .................. 451/5 |
| 6,869,498 | B1 * | 3/2005 | Tsai et al. ............. 156/345.13 |
| 7,108,580 | B2 * | 9/2006 | Ushio et al. ................ 451/8 |
| 7,135,852 | B2 | 11/2006 | Renken et al. ........... 324/158.1 |
| 7,151,366 | B2 | 12/2006 | Renken et al. ........... 324/158.1 |
| 2003/0022595 | A1 | 1/2003 | Lai et al. ................... 451/5 |

(Continued)

FOREIGN PATENT DOCUMENTS

DE    3815566    11/1989

(Continued)

OTHER PUBLICATIONS

U.S. Appl. No. 60/828,000 to Wayne G. Renken et al., entitled "Pressure Sensing Wafer", filed Oct. 3, 2006.

(Continued)

*Primary Examiner*—Max Noori
(74) *Attorney, Agent, or Firm*—Joshua D. Isenberg; JDI Patent

(57) ABSTRACT

At least one shear force sensor is used to measure the shear force on a member, when the member is in contact with and pressed against a polishing or planarization surface and a lateral force is applied between the two surfaces. Preferably the structure and the surface of the structure have properties (such as one or more of the following: dimensions and coefficient of friction) that are substantially the same as those of a real substrate, such as a semiconductor wafer or flat panel display panel.

21 Claims, 11 Drawing Sheets

U.S. PATENT DOCUMENTS

| | | | |
|---|---|---|---|
| 2004/0023606 A1 | 2/2004 | Wang et al. | 451/296 |
| 2004/0098216 A1 | 5/2004 | Ye et al. | 702/127 |
| 2005/0239371 A1 | 10/2005 | Togawa | 451/5 |
| 2005/0263760 A1 | 12/2005 | Langer et al. | 257/48 |
| 2007/0243794 A1 | 10/2007 | Mundt | 451/5 |
| 2007/0251339 A1 | 11/2007 | Wiese et al. | 73/866.1 |
| 2008/0087069 A1* | 4/2008 | Renken et al. | 73/1.63 |

FOREIGN PATENT DOCUMENTS

| | | |
|---|---|---|
| DE | 4413442 | 9/1994 |
| WO | WO 90/13425 | 11/1990 |
| WO | WO 00/28277 | 5/2000 |

OTHER PUBLICATIONS

U.S. Appl. No. 60/828,351, to Wayne G. Renken et al., entitled "Pressure Sensing Wafer", filed Oct. 5, 2006.

U.S. Appl. No. 11/861,119, to Wayne G. Renken et al., entitled "Pressure Sensing Device", filed Sep. 25, 2007.

Invitation to Pay Additional Fee, from ISA, dated Apr. 14, 2008—International Patent Application No. PCT/US2007/080197.

* cited by examiner (BASE)

(COVER)

(BASE)

(COVER)

(SIDE VIEW)

(TOP VIEW)

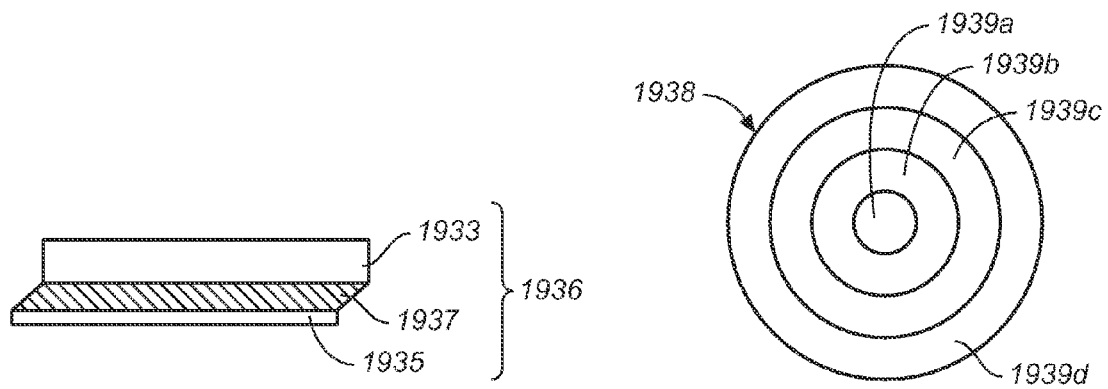
FIG. 19A
FIG. 19B
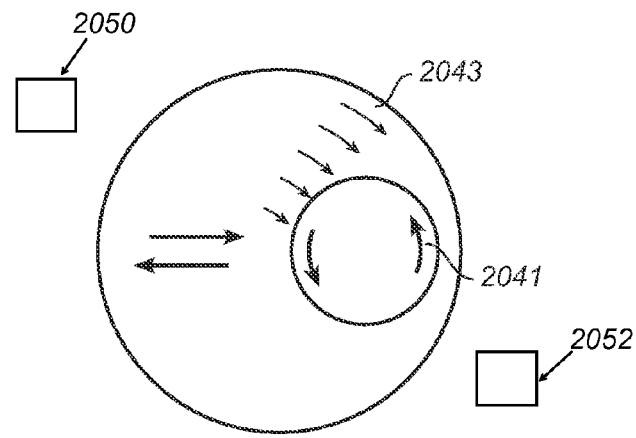
FIG. 20
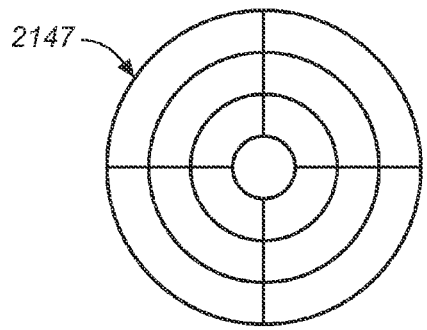
FIG. 21A
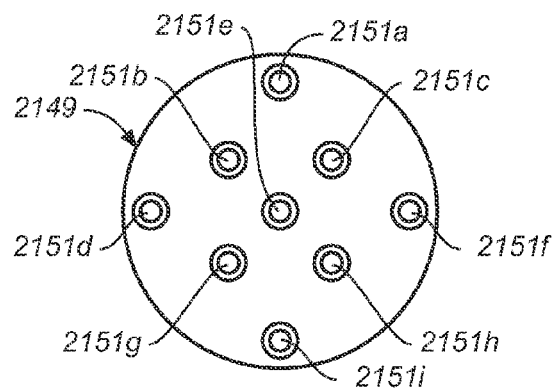
FIG. 21B

PROCESS CONDITION MEASURING DEVICE AND METHOD FOR MEASURING SHEAR FORCE ON A SURFACE OF A SUBSTRATE THAT UNDERGOES A POLISHING OR PLANARIZATION PROCESS

CROSS-REFERENCE TO RELATED APPLICATION

This non-provisional application claims the benefit of provisional applications No. 60/828,000, filed Oct. 3, 2006, by Wayne G. Renken et al., entitled "Pressure Sensing Wafer," and No. 60/828,351, filed Oct. 5, 2006, by Wayne G. Renken et al., entitled "Pressure Sensing Wafer," which applications are incorporated herein in their entireties by this reference. This application is also related to an application Ser. No. 11/392,220, filed Mar. 28, 2006, by Randall S. Mundt, entitled "Apparatus for Measurement of Paramenters in Process Equipment," also incorporated herein in its entirety by this reference. This application is also related to an application filed on the same day as this application, entitled "Pressure Sensing Device," by Wayne G. Renken et al., also incorporated herein in its entirety by this reference.

BACKGROUND OF THE INVENTION

Semiconductor processing involves multiple steps to produce working integrated circuits on a semiconductor wafer. These steps may include deposition and removal of various materials to form devices and to form the electrical connections between devices. One process that removes material from a wafer is Chemical Mechanical Polishing or Planarization (CMP). CMP generally leaves a planar surface, so that it is particularly suitable for applications where an uneven topology might cause problems, for example where additional layers are to be deposited over a surface formed by previous processing. In particular, where multiple layers of metal interconnection are required in complex integrated circuits, CMP allows successive layers to be formed while maintaining a reasonably flat surface for each successive layer.

CMP generally involves removing material from a wafer by a combination of physical abrasion and chemical action. FIG. 1 shows a cross-section of a wafer 101 that is undergoing a CMP process. The wafer 101 is pressed down into a pad 103 by pressure applied to its upper surface. Pressure may be applied by a plate or pad. In some cases, pressure is applied to the upper surface of the wafer 101 by hydraulic or pneumatic systems. In this way the pressure may be controlled. In some cases, different pressure is provided at different locations on the upper surface of the wafer. Here $P_E$ is provided near the edge, while Pc is provided at the center. Different pressures may be provided for a series of concentric zones with separate hydraulic, pneumatic or other systems to separately control pressure. Some relative movement is created between the wafer 101 and the pad 103 by moving one or both of these components. As the wafer 101 moves with respect to the pad 103 its lower surface is eroded. A retaining ring 105 keeps the wafer 101 in position with respect to structures providing pressure Pc and $P_E$ to the upper side of the wafer 101. A slurry 107 extends over the pad 103, including the area under the wafer 101. Slurry 107 may be introduced through holes in pad 103. This slurry 107 contains abrasive particles as well as chemical components that may react with material on the wafer. The pad 103 is generally formed of a soft material that deforms under the pressure exerted by a wafer. In general, CMP systems operate so that material is removed from the lower surface of the wafer. Thus, a wafer is generally turned so that the side of the wafer to be processed (generally, the side that contains semiconductor devices and connections) is facing downwards.

In general it is desirable to remove material uniformly across the surface of a wafer. Various parameters may vary across the wafer surface causing nonuniform removal rates. One parameter that may vary across the wafer is the pressure between the pad and the wafer. For example, in FIG. 1, pressure P1 may not be equal to pressure P2. It is generally desirable to know the values of pressure P1 and P2 in order to adjust the CMP process to obtain high uniformity. While the pressures P1 and P2 between the wafer 101 and the pad 103 are affected by the pressures Pc, $P_E$ applied to the top surface of the wafer 101, these relationships may not be simple so that measuring Pc and $P_E$ may not provide sufficient information for process tuning. Therefore, it is generally desirable to directly measure pressure at points across a wafer surface during processing. CMP processes may also be applied to substrates other than semiconductor wafers, such as flat panel display panels and magnetic heads or still other types of work pieces.

SUMMARY OF THE INVENTION

Before or periodically during the CMP process, the CMP head that is used to apply pressure may also need to be tuned in a tuning process, so that the pressures that are applied to the substrates of the type mentioned above are the desired pressures. Certain embodiments of the device proposed herein are also useful for the tuning process.

In one embodiment, a member comprises a diaphragm to which pressure is applied, causing the diaphragm to deflect. At least one pair of capacitively coupled electrodes is used to sense the deflection of the diaphragm, wherein a capacitance of the at least one pair varies as a function of deflection of the diaphragm. Thus, by sensing the capacitance of the pair, it is possible to provide an indication of the deflection of the diaphragm, which in turn provides an indication of the pressure on the diaphragm. Preferably, the member has a property that is substantially the same as that of the substrate.

In general, removal of material in CMP is caused by two mechanisms: mechanical action and chemical action. Although these mechanisms are closely linked, it may be desirable to try to separately measure parameters associated with each. One measurement that may be of particular value in measuring mechanical action is the frictional force between a wafer and a pad as the wafer moves with respect to the pad. Generally, mechanical abrasion of material increases with increasing frictional force. Frictional force may be used to provide a shear force in a structure that deforms in a manner that indicates the magnitude of the shear force. In general, greater frictional force provides greater mechanical action in removing material during CMP.

In another embodiment, a member is used, which member is suitable for undergoing a CMP process to simulate behavior of said substrate in the process. At least one sensor is attached to the member. The at least one sensor measures a parameter related to a shear force on a surface of the member when such surface is in contact with and pressed against a CMP surface and a lateral force is applied between the polishing or planarization surface and the surface of the member. Preferably, the surface of the member in contact with the CMP surface has a property that is substantially the same as a property of the surface of the substrate that the member simulates.

BRIEF DESCRIPTION OF THE DRAWINGS

FIG. 16A shows a first rigid body in contact with a surface and connected to a second rigid body by a portion of elastomeric material, where the. FIG. 16A first rigid body at rest with respect to the surface.

Figure 18:
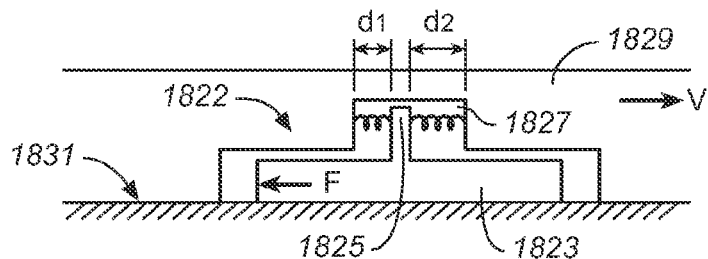

Shown in FIG. 18 is an alternative shear force sensor, where frictional force may be measured by allowing relative movement between two rigid bodies.

FIG. 19A shows an example of a device where a base and a cover are separated by an elastomeric layer that deforms as the cover moves across a surface. In this case, a measurement is obtained for the entire device indicating the total frictional force experienced.

FIG. 19B shows a plan view of a device having a lower surface consisting of concentric rigid bodies that are separated from a base by an elastomeric material. The rigid bodies are physically separated from each other by small gaps so that they can move separately with respect to a base. Electrodes attached to the elastomeric material connecting the rigid bodies may be used to obtain separate resistance measurements to indicate the amount of frictional force experienced by different rigid bodies.

FIG. 20 illustrates how a wafer may move with respect to a pad in one embodiment. The pad is preferably a circular pad that rotates clockwise. The wafer rotates counter-clockwise and is moved laterally across the pad.

FIG. 21A shows a device that measures shear force at different radial and angular locations across a surface. FIG. 21A shows the bottom (cover) side of a device similar to that of FIG. 19B but with separate rigid bodies (separate shear force sensors) for different angular zones.

FIG. 21B shows an alternative device for measuring shear force at different locations on a surface. Cut-outs are formed in a cover for shear force sensors with room to allow some displacement.

DETAILED DESCRIPTION OF EXEMPLARY EMBODIMENTS

Process Condition Measuring Devices (PCMDs) include instrumented wafers that have physical dimensions the same, or close to, those of a production wafer and that include sensors and electronics to measure at least one process condition. Various PCMDs are described in U.S. patent application Ser. Nos. 10/718,269, 10/837,359 and 11/381,992. PCMDs may be wired or wireless. A wired PCMD sends data to an external unit over wires (or optical fibers). A wireless PCMD either stores data in a memory in the PCMD or may transmit the data to an external unit. Generally, wireless PCMDs are more suitable for studying processes where a wafer is rotated such as CMP.

Figure 1:
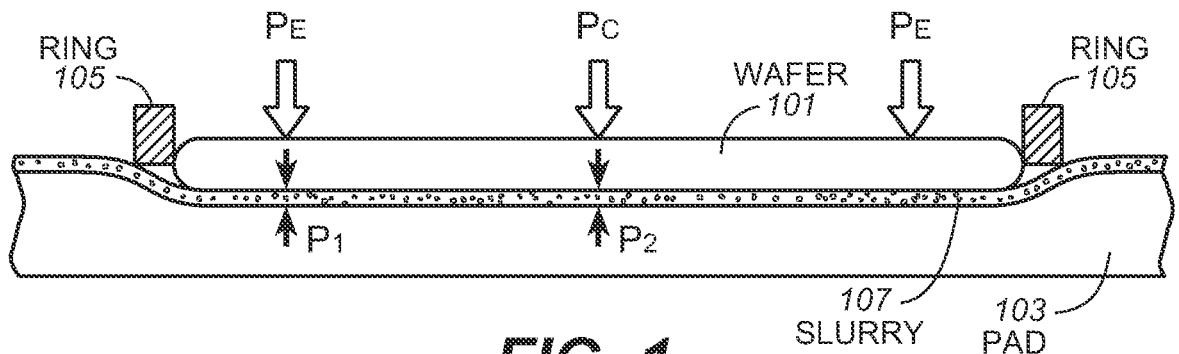
FIG. 1 is a view of a cross-section of a semiconductor wafer undergoing a CMP process useful for illustrating the invention.
Figure 2:
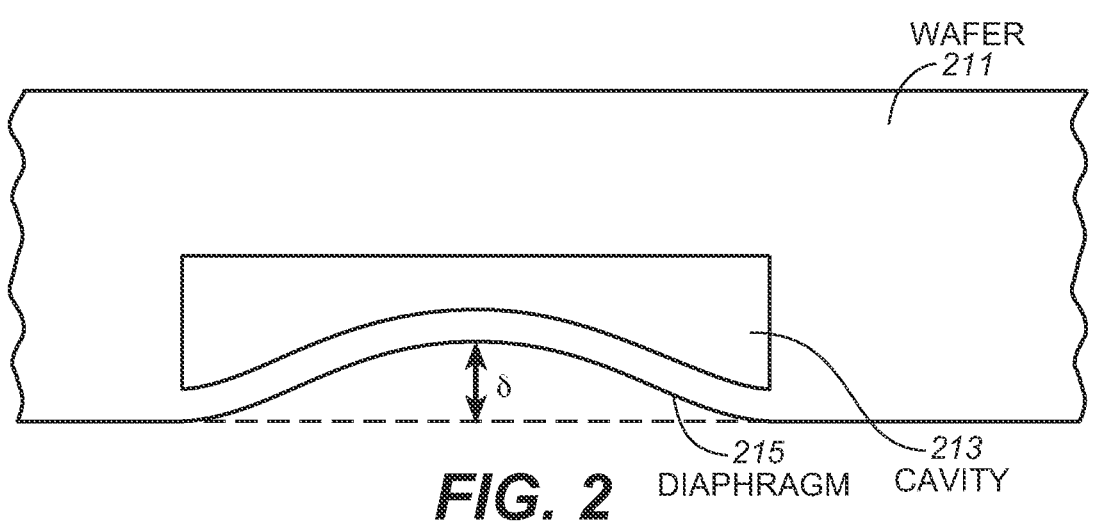
FIG. 2 shows an example of a device or member such as one in the shape of a plate having a cavity that is covered by a diaphragm for measuring pressure or force to illustrate one embodiment of the invention.

One way to measure pressure on a wafer surface is to form a cavity within the wafer, leaving a thin layer over the cavity that acts as a diaphragm and deflects under pressure. FIG. 2 shows an example of a wafer 211 having a cavity 213 that is covered by a diaphragm 215. Under pressure, the diaphragm 215 deflects by an amount δ that depends on the external pressure. In general, δ may be used as an indicator of pressure applied to the lower surface of the wafer 211. Where a suitable sensor is used to sense deflection, and electronics are provided in the wafer 211 to store sensor data or transmit sensor data (or store and later transmit data), such a PCMD may provide actual pressure data during a process such as CMP. Pressure on the lower surface of a substrate during CMP is generally less than five pounds per square inch (5 psi), in addition to atmospheric pressure. In some cases, pressures may be up to 15 psi, or even greater.

Various methods may be used to measure the deflection of a diaphragm such as diaphragm 215 of FIG. 2. One convenient method is to form a first capacitor electrode on the diaphragm, another electrode capacitively coupled to the first capacitor electrode fixed within the cavity and measure any change in capacitance. A second convenient method is to use a strain gauge. In general, it is preferable that the deflection in a diaphragm used in this application should be small so that the surface being eroded behaves similarly to that of a production wafer that does not contain cavities and does not deflect in this way. Generally, such a deflection is maintained at less than 10 microns, though in some cases deflections may exceed 10 microns. This may be achieved by choosing appropriate dimensions and material of the appropriate flexibility for the diaphragm and wafer of FIG. 2.

FIGS. 3A-3D show different embodiments where capacitance is used to measure deflection. These capacitive pressure sensors use a cavity formed in a laminated wafer. A laminated wafer or other structure is formed to include a base and a cover, the base generally being thicker than the cover. The cover, or a portion of the cover, is sufficiently thin so that it deflects under pressure. The base is generally formed by thinning a Silicon wafer and the cover is generally formed by thinning a Silicon wafer that has been processed up to a point where it is to be subjected to CMP processing. In this way, the lower surface of the cover closely resembles the lower surface of a production wafer including the same materials and topology. The base and cover are attached to form a single unit. In general, the thickness of the unit (PCMD) formed is such that the pressures at the lower surface of the unit are close to those of a production wafer. This may require a thickness that is close to the thickness of a production wafer because a thicker PCMD would generally be stiffer and thus distribute pressure differently. Preferably, these capacitive pressure sensors simulate a real work piece or substrate that is undergoing a CMP process or a substrate to which a CMP head is to be applied (where the CMP head needs to be tuned). For this purpose, it is preferable for the laminated wafer or structure to have properties (such as one or more of the following: dimensions, hardness, area and flexibility) that are substantially the same as those of a real substrate, such as a semiconductor wafer or flat panel display panel.

Figure 3A:
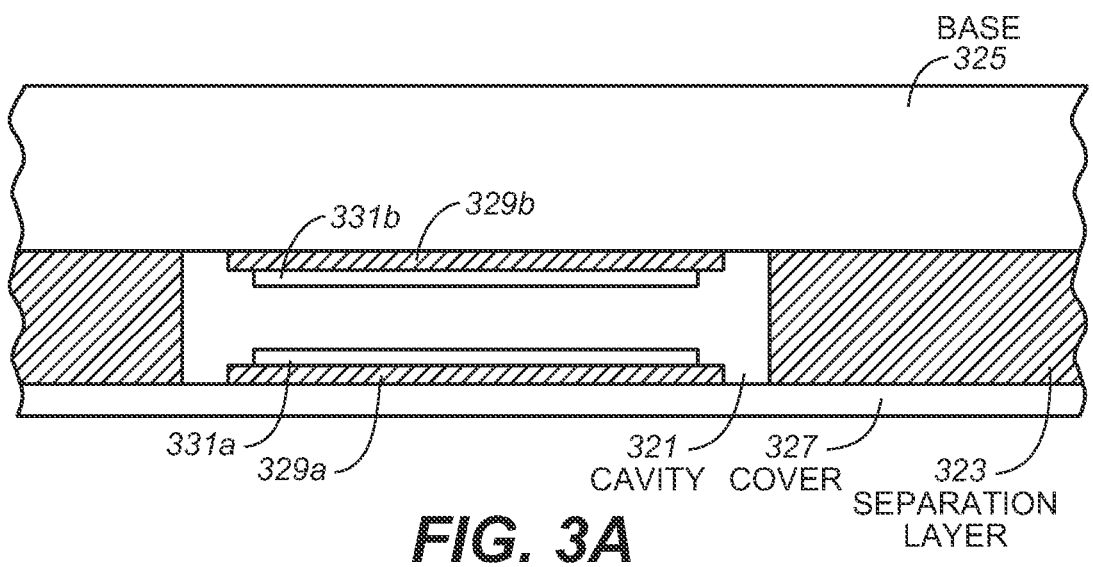
FIGS. 3A-3D are cross sectional views of capacitive pressure sensors that include a plate for measuring pressure or force to illustrate different embodiments of the invention. A cavity is formed in a base or cover portion of the plate or a separation layer between the base and the cover.

FIG. 3A shows a cross section of a first capacitive pressure sensor where a cavity 321 is formed in a separation layer 323 that extends between a base 325 and a cover 327. The separation layer 323 may be formed of a material such as Kapton® polyimide film that may be have cut-outs formed according to a predetermined pattern. An electrical insulator 329a is formed on the cover 327 and a capacitor electrode 331a is formed on the insulator 329a. In one example, the insulator is between 5 microns and 50 microns thick. The electrode 331a may be formed by attaching a metal foil or by depositing a metal layer. An insulator 329b and electrode 331b are similarly formed on the base 325. The base 325, cover 327 and separation layer 323 are aligned during assembly so that the electrodes 331a, 331b are in cavity 321. In this embodiment, no special topology is formed in opposing surfaces of either the base 325 or the cover 327. These surfaces of the base 325 and the cover 327 may be planar.

Figure 3B:
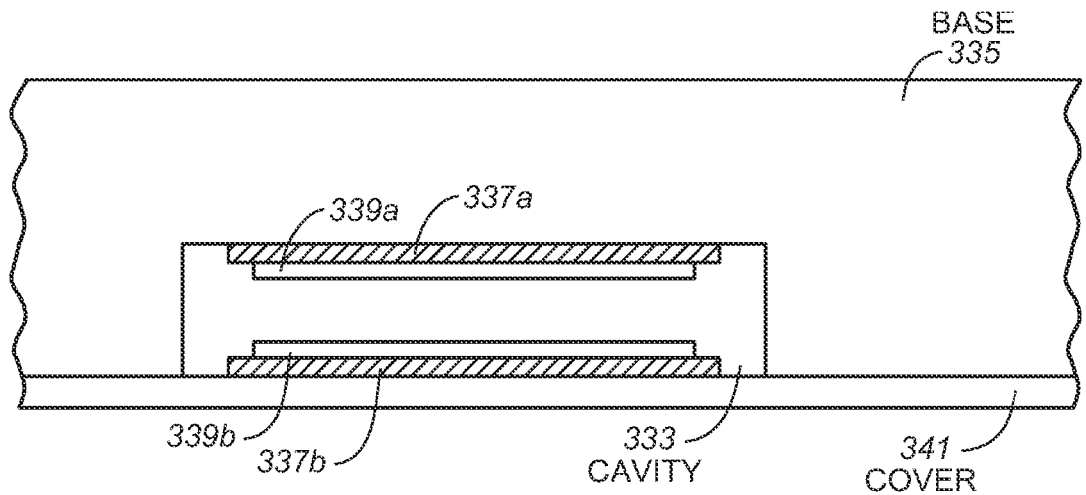

FIG. 3B shows an alternative embodiment where a cavity 333 is formed into a base 335. The cavity 333 may be machined, etched or otherwise formed in the base 335. An insulator 337a is then formed in the cavity 333 and an electrode 339a is formed on the insulator 337a as before. An electrode 339b and insulator 337b are similarly formed on the cover 341.

Figure 3C:
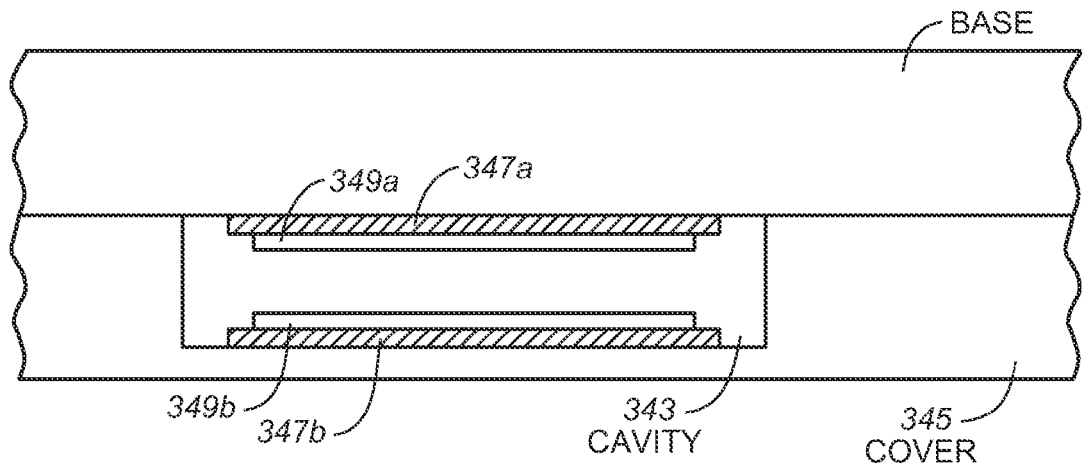

FIG. 3C shows an alternative embodiment where a cavity 343 is formed into a cover 345. Insulators 347a, 347b and electrodes 349a, 349b are formed as before. The cover 345 may be relatively thick in this example because it is reduced to a suitable thickness where cavities are formed. The examples of FIGS. 3A-3D show three locations for the cavity: in a separation layer, in a base, and in a cover. A cavity may also be formed in a combination of these components, for example partially in the base and partially in the cover, or partially in a separation layer and partially elsewhere, either in the base or in the cover or in both.

It should be noted that the drawings are not to scale and are not intended to accurately represent the relative proportions of the features shown. Certain dimensions are exaggerated to more clearly show the structures. In one example, a capacitive sensor includes a cavity having a diameter of 10 millimeters and an electrode of between 3 and 10 millimeters diameter, with a spacing between electrodes of 25-50 microns. The diaphragm may have a thickness between 125 microns and 800 microns. The insulators in this example have a thickness of 25 microns and the electrodes have a thickness of less than 25 microns. In other examples, different dimensions may be used. Such a capacitive sensor may be able to resolve pressure to an accuracy of 0.01 pounds per square inch.

Figure 3D:
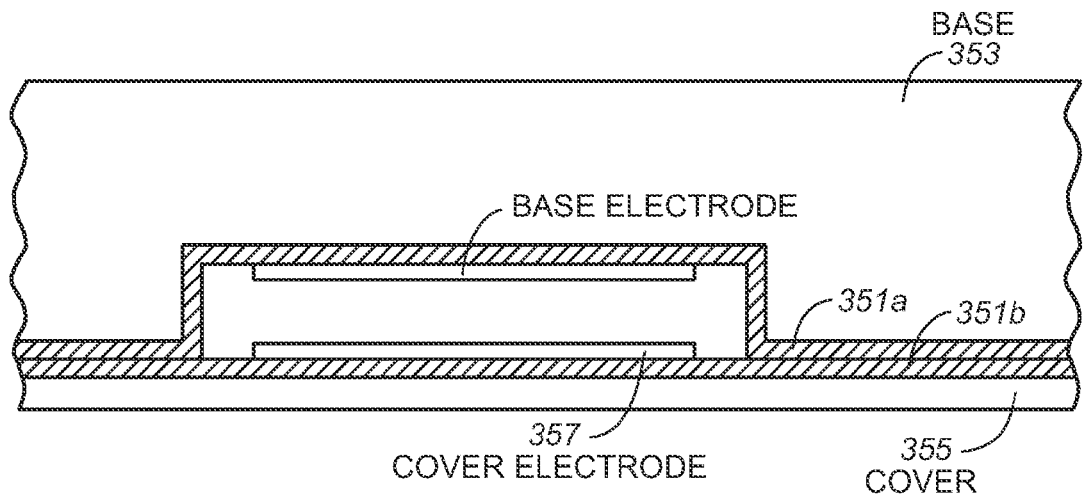

FIG. 3D shows another embodiment where instead of forming local insulators to isolate capacitor electrodes from the underlying surface, blanket insulating layers 351a, 351b are formed on both a base 353 and on a cover 355 respectively. A blanket layer extends over all exposed surfaces on at least one side of a wafer. The blanket layer is formed in such a way that the wafer is not warped and thus retains a substantially planar surface. Such an insulating layer may be formed by deposition or may be grown, such as by growing a Silicon Dioxide layer on a Silicon surface. Where a cavity is formed in either the cover or the base, the insulating layer may be formed after the cavity is formed so that the insulating layer extends across surfaces of the cavity. A blanket insulating layer may be used as an alternative to individual insulators in any of the above examples.

The base and cover may be electrically isolated from each other in some cases or may be electrically connected as described in U.S. patent application Ser. No. 11/381,992. The base and cover may be formed of either doped or undoped material and so may have different electrical conductivities according to requirements. Where the base and cover are undoped or have little doping so that the resistivity of the base and cover material is high, it may be possible to place electrodes directly on the surface of the base or cover (without an insulator or insulating layer). Where either the base or the cover is conductive, a parasitic capacitor may be formed between the conductive base (or cover) and an electrode that is separated from it by an insulator. In order to reduce the effects of such a parasitic capacitor, dimensions may be chosen so that the capacitive sensor has a greater capacitance than the parasitic capacitor.

Figure 4A:
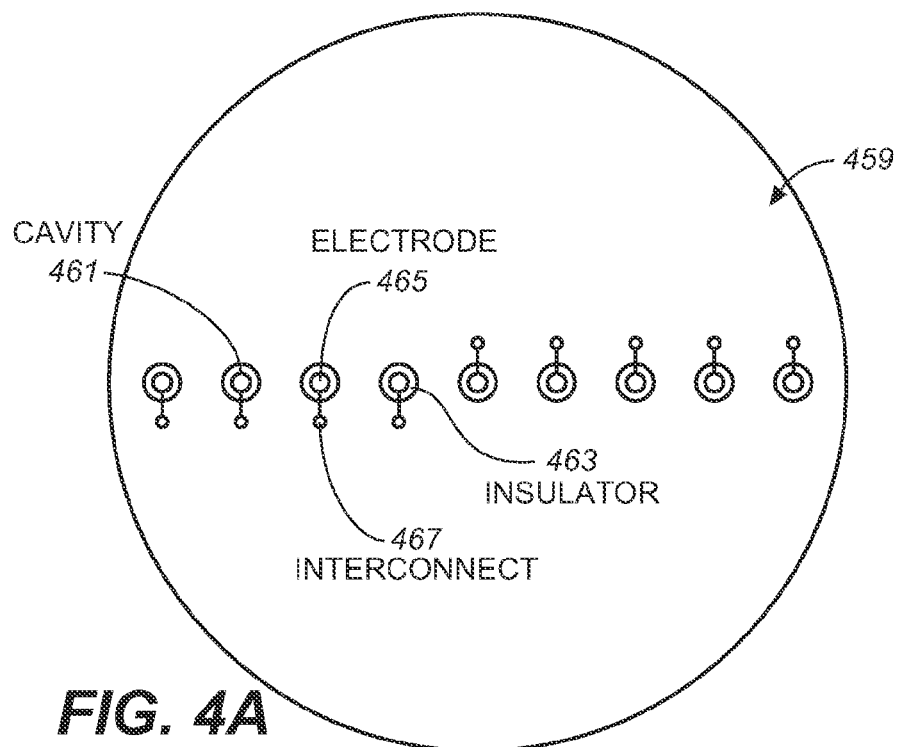
FIG. 4A shows a plan view of a base formed from a bare Silicon wafer.

FIG. 4A shows a plan view of a base 459 formed from a bare Silicon wafer. The base contains a number of cavities, including cavity 461. Within these cavities insulators, such as insulator 463, are formed. Capacitive sensor electrodes, such as electrode 465, are formed on the insulators. Thus, the base 459 of FIG. 4A corresponds to the base 335 shown in FIG. 3B. FIG. 4A also shows interconnects (pads), including interconnect 467 that form connections between the top capacitive sensor electrodes and the electronics in the base. Both electrodes are connected to electronic circuits (not shown) in the base to allow the capacitance to be measured. The cavities and electrodes of this example are circular in shape, in other examples square, rectangular or other shaped cavities and electrodes may be used. The shapes of the electrode or electrodes are not necessarily the same as the shapes of the cavities in which they are located. FIG. 4A shows sensor cavities extending along a diameter of the base. It may generally be assumed that the pressure distribution in a CMP process is radially symmetric (having the same pressure at all points along a given radius). However, in some cases sensor cavities may be distributed in a different manner so that pressures at are obtained at different angular locations.

Figure 4B:
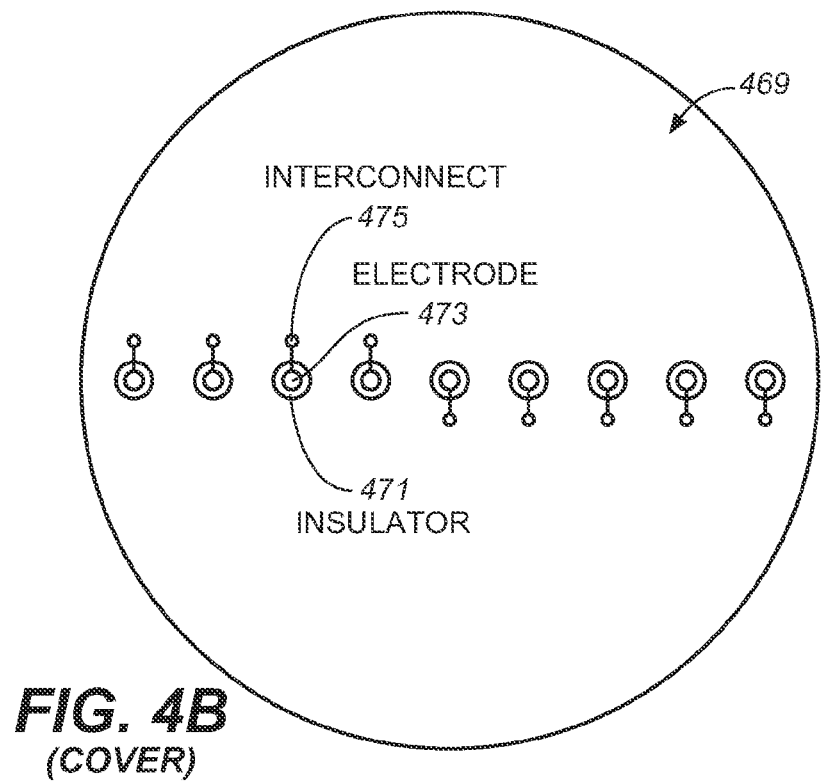
FIG. 4B shows a plan view of a cover formed from a thinned bare Silicon wafer. The cover is designed to be attached to the base of FIG. 4A to form an instrumented wafer that includes a number of capacitive pressure sensors for measuring pressure or force to illustrate one embodiment of the invention.

FIG. 4B shows a plan view of a cover 469 formed from a thinned bare Silicon wafer. Cover 469 is designed to be attached to the base 459 of FIG. 4A to form an instrumented wafer that includes a number of capacitive pressure sensors. Insulators, such as insulator 471, are formed on the cover 469 and capacitive sensor electrodes, such as electrode 473, are formed on the insulators. Also shown are interconnects to the base, including interconnect 475. These interconnects are aligned with interconnects on the base to form an electrical connection between electrodes and the electronics.

Figure 5A:
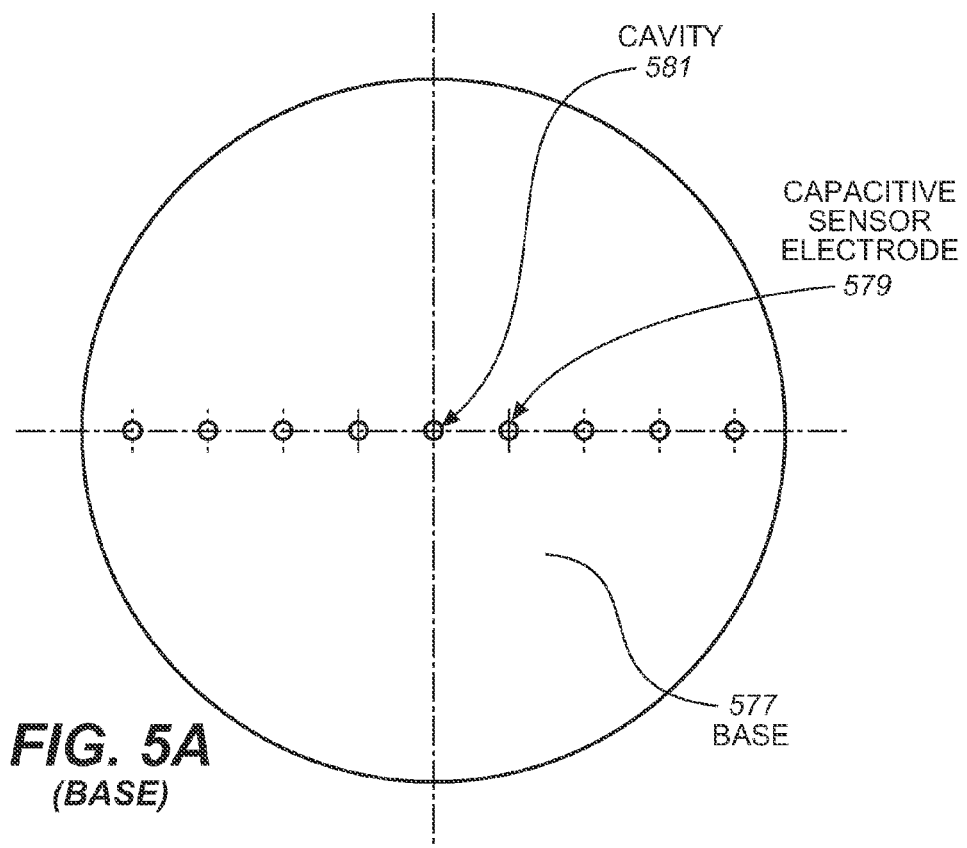
FIG. 5A shows a plan view of a base of a device according to another embodiment of the invention.

FIG. 5A shows a plan view of a base 577 of a PCMD according to another embodiment. In the example of FIG. 5A, no separate insulators are provided on the base 577 because the base 577 is formed from a Silicon wafer with an insulating layer (as shown in FIG. 3D). Capacitive sensor electrodes, including electrode 579, are placed directly on the insulating layer. Cavities, such as cavity 581, may either be formed in the base 577 or may be formed in a spacer layer that has holes located between electrodes of the base and cover. In general, some electronic circuits (not shown) are also located in or on such a base and such electronic circuits are connected to the electrodes on the base and the electrodes on the cover.

Figure 5B:
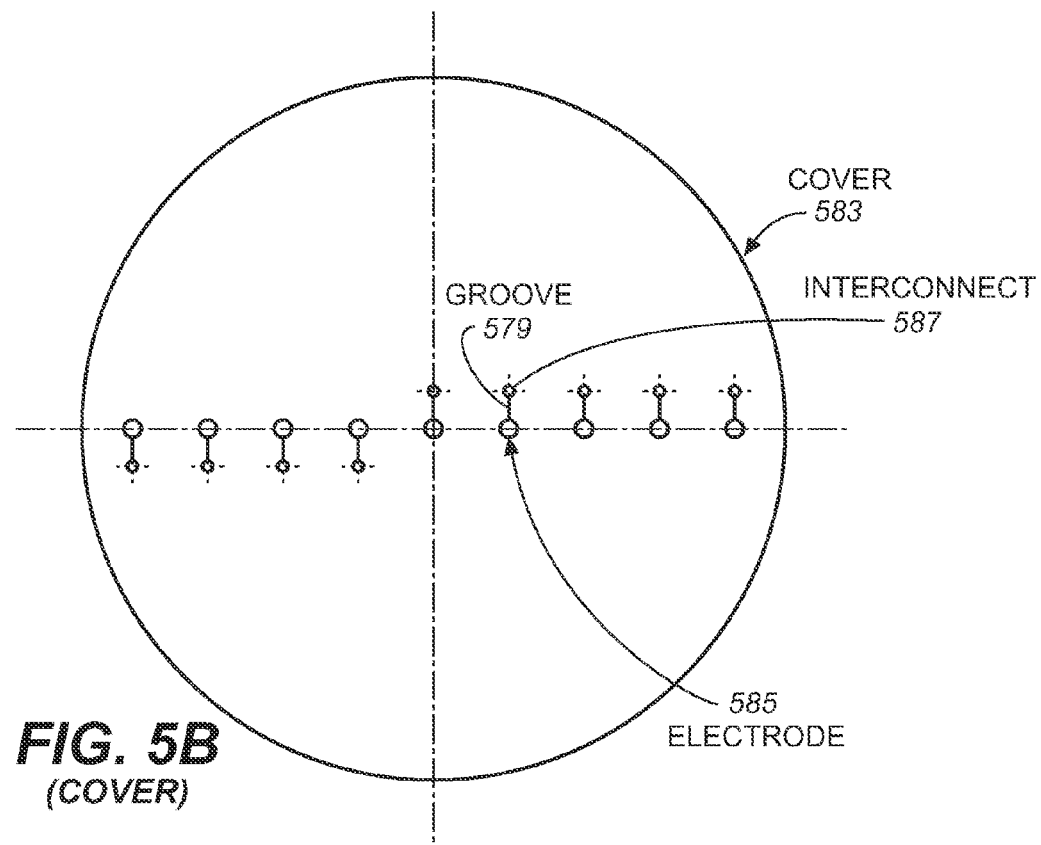
FIG. 5B shows a plan view of a cover designed to be attached to the base of FIG. 5A to form an instrumented wafer.

FIG. 5B shows a plan view of a cover 583 designed to be attached to the base 577 of FIG. 5A to form a PCMD (instrumented wafer). Cover 583 has an insulating layer formed of Silicon dioxide or other suitable dielectric material and so does not require separate insulators under individual electrodes. Electrodes, such as electrode 585, are formed (by deposition or otherwise) directly on the insulating layer. FIG. 5B also shows interconnects, including interconnect 587 that connect the electrode of the cover to electronics in the base 577. A groove (or trench) 579 is provided to allow connection between the electrode 585 and the interconnect 587. An electrical connection between the interconnect and the electrode may be formed by the same deposition step that forms the electrode 585 or may be formed separately. In one example, electrodes and interconnects are formed by silk screening or similar thick film techniques.

In general, where a cavity is formed for a pressure sensor, it is desirable to isolate the cavity from the exterior environment. This prevents foreign material from entering the cavity, which could affect sensor performance. In particular, slurry used in CMP could cause damage to electrodes and other components if it entered such a cavity. However, an isolated cavity may experience a significant increase in pressure as a diaphragm is deflected. Even though the change in the volume of the cavity is small, if the cavity itself is small, the change in volume and hence the change in pressure may be significant. Such a pressure change is generally undesirable because it may cause a non-linear relationship between deflection and the external pressure.

One way to reduce the pressure change caused by a diaphragm deflecting into a cavity is to provide an additional volume in communication with the cavity. This additional volume reduces the effect of volume change caused by diaphragm deflection on pressure in the sensor cavity. The additional volume may be considered a reservoir. Such a reservoir is generally formed so that its volume does not change as a result of external pressure. For example, support may be provided to ensure that significant deflection does not occur in a reservoir.

Figure 6A:
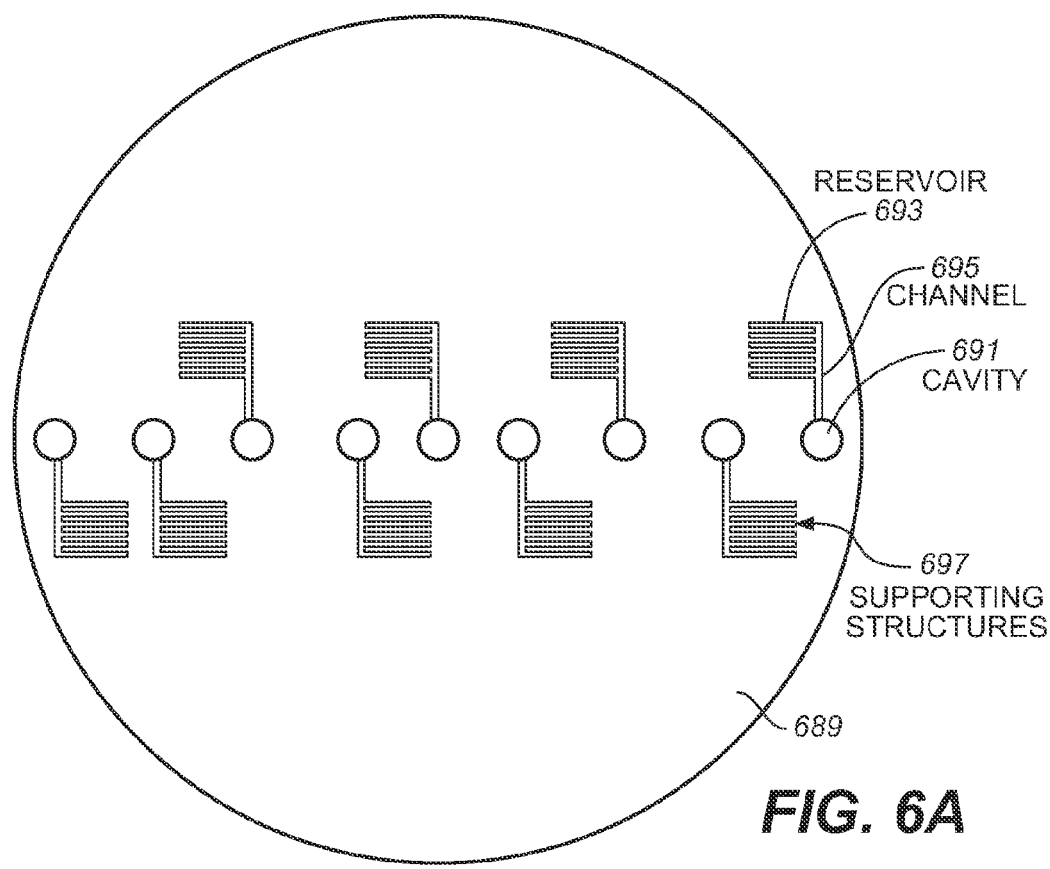
FIG. 6A shows a first example of a wafer for measuring pressure or force having sensor cavities with reservoirs illustrate one embodiment of the invention.

FIG. 6A shows a first example of a wafer 689 having sensor cavities with reservoirs. For example, sensor cavity 691 connects with reservoir 693. A reservoir may be formed as a cavity in the base (or cover, or separation layer, or a combination of these components) in the same manner as the cavity for the sensor. A channel 695 connects the reservoir 693 to the sensor cavity 691. To avoid significant volume change in a reservoir, supporting structures 697 extend across a reservoir to limit any deflection that might occur in the cover over this area. Each sensor cavity of FIG. 6A has a dedicated reservoir. In some cases, a reservoir may be deeper than a sensor cavity so that its volume is greater for a given cross sectional area.

Figure 6B:
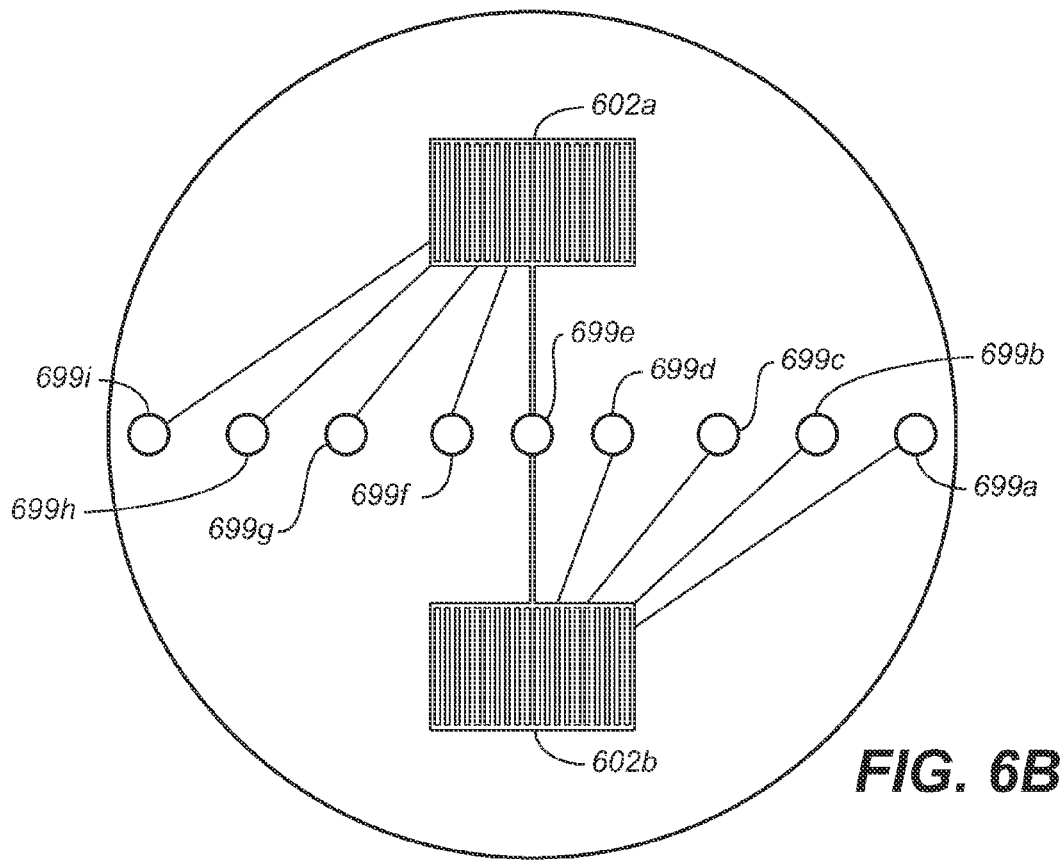
FIG. 6B shows an alternative configuration to that of FIG. 6A.

FIG. 6B shows an alternative configuration to that of FIG. 6A. In FIG. 6B, instead of dedicated reservoirs, sensor cavities 699*a-i* share a reservoir system that interconnects cavities 699*a-i* and reservoirs 602*a*, 602*b*. Such a reservoir system may be formed by the same process used to form sensor cavities 699*a-i*. A pattern of sensor cavities, reservoirs and interconnecting channels may be formed in the base (and/or other components) as shown. In this example, the reservoir system is isolated from the exterior of the PCMD so that no foreign matter can enter the reservoir system and the pressure in the reservoir system remains stable.

In some cases it may be desirable to have an opening from a reservoir system in a PCMD to the exterior of the wafer. For example, it may be desirable to equalize the pressure in the reservoir system with the ambient pressure. In some cases, equalization may be used to eliminate a pressure differential that might be caused by different atmospheric pressure resulting from use at different altitudes or in different weather conditions. It may also be desirable to bring the reservoir system to a predetermined condition before use. For example, the reservoir system may be brought to a desired pressure, either above atmospheric pressure or below atmospheric pressure (under vacuum). The reservoir system may also be filled with a particular gas or mixture of gases if desired.

Figure 7:
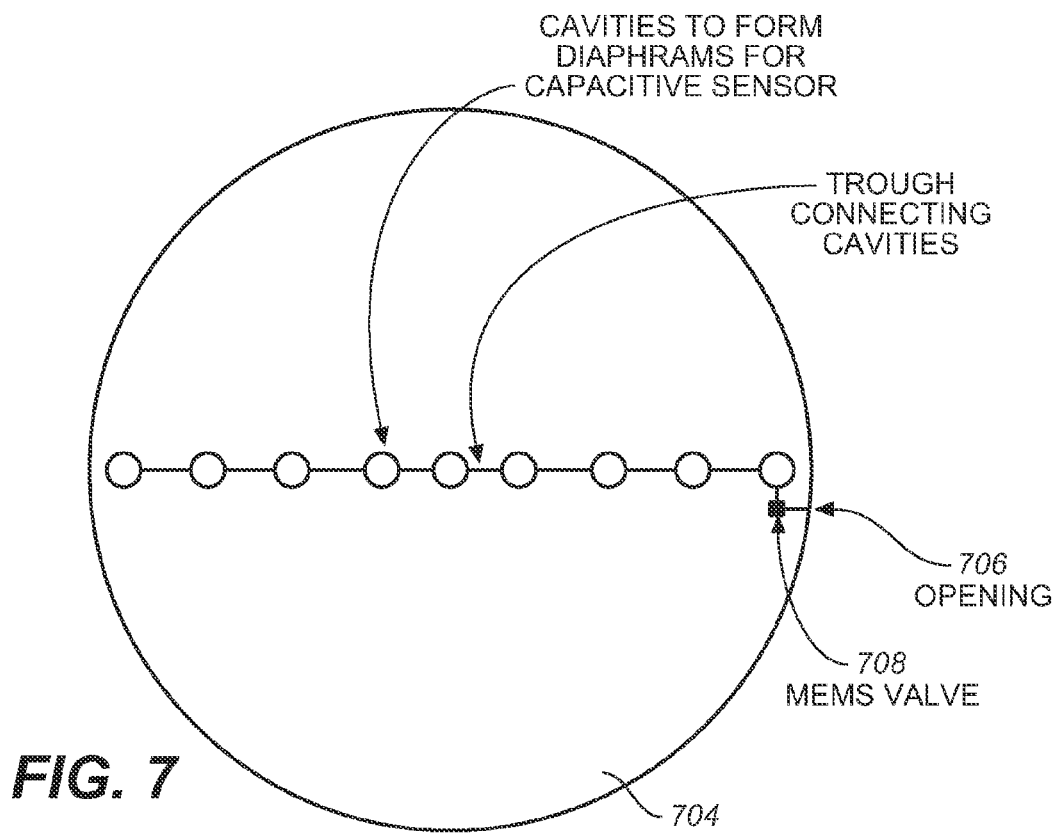
FIG. 7 shows an example of a device with a reservoir system that has an opening 706 to the exterior of the device and a valve controlling the opening to illustrate one embodiment of the invention.

FIG. 7 shows an example of a PCMD 704 with a reservoir system that has an opening 706 to the exterior of PCMD 704. A valve is provided to selectively connect the opening 706 to the reservoir system. Microelectromechanical Systems (MEMS) technology enables valves and other components to be formed on an extremely small scale. A MEMS valve 708 may be formed in the base, or may be formed separately and attached to the base. The MEMS valve may be controlled by electronic circuits in PCMD 704. When PCMD 704 is in use, the MEMS valve will generally remain closed to prevent foreign matter entering the reservoir system. The MEMS valve 708 may be opened by an electronic circuit in PCMD 704, generally in response to a signal provided from outside PCMD 704. This may occur during a calibration or initialization procedure. An alternative to a MEMS valve is to provide a temporary blockage that covers the opening 706. A suitable material, for example a polymer such as Silicone, may be used to block the opening. The blockage formed may be removed to configure the reservoir system.

In general, electronic circuits are provided in a PCMD to store data from the sensors. Circuits may alternatively transmit data to a receiver outside the PCMD. In some cases, data is first stored and then transmitted. Such circuits may be formed and connected in a number of ways. In one arrangement, electronic circuits include one or more integrated circuits that are placed in cavities in a base (or cover). The integrated circuits are bonded in place. Electrical connections between integrated circuits and sensors are provided by conductive traces formed on the surface of the base (or cover). Connection pads on the integrated circuits may be bonded to these traces. Integrated circuits used in this configuration may be used in the form of semiconductor dies so that they have small profiles and small thermal capacities. Instead of using traces on a surface, insulated wires may extend between components including sensors and integrated circuits. Such wires may be bonded to the components and may run through trenches formed within a PCMD.

In another arrangement, electronic circuits and connections between circuits are formed as a flex circuit assembly that is attached to a base. Generally, cavities and grooves are formed in the base so that such a flex circuit presents a surface that is flush with the surface of the base. A cover may then be attached. Descriptions of the use of such flex circuits and traces in PCMDs are provided in U.S. patent application Ser. Nos. 10/837,359 and 11/381,992.

Figure 8A:
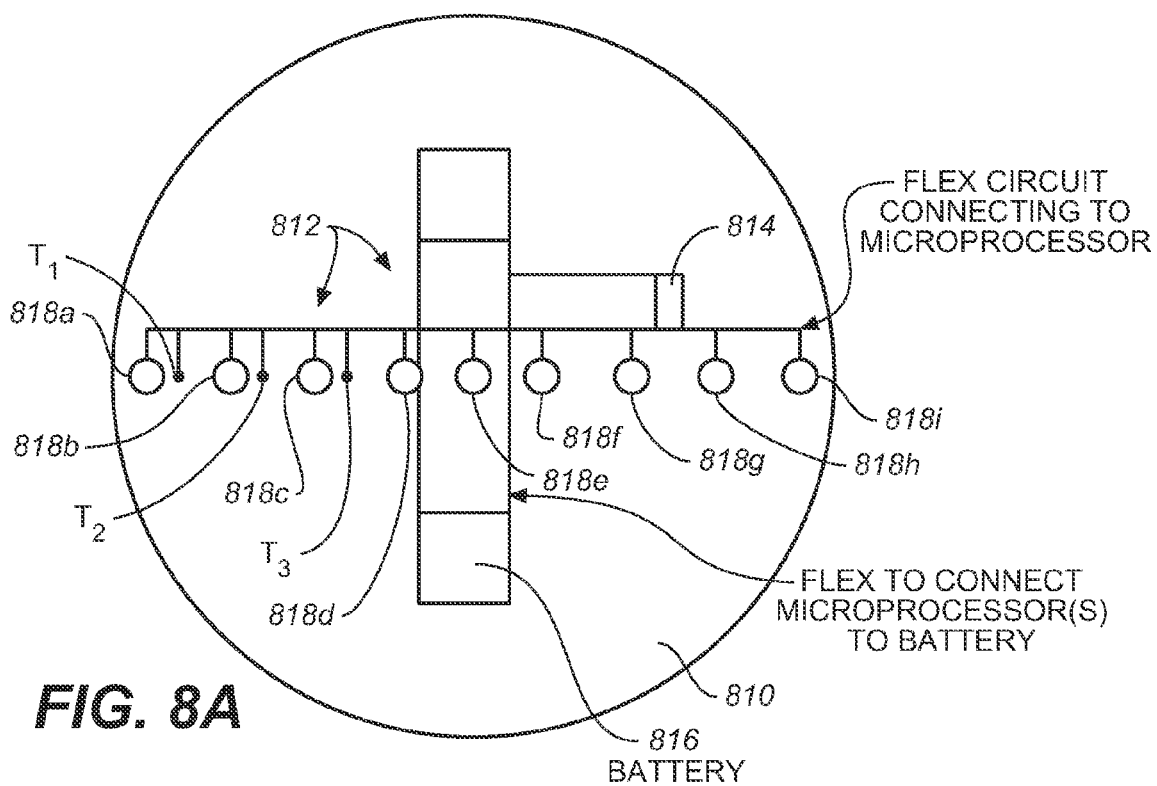
FIG. 8A shows an example of a device that includes a flex circuit for measuring pressure or force.

An example of a PCMD 810 that includes a flex circuit 812 is provided in FIG. 8A. The flex circuit 812 includes at least one microprocessor 814 that is in communication with the sensors. Microprocessor 814 may include a memory for storing data from the sensors, and/or transmitter circuits for transmitting such data to an external device, preferably by wireless transmission, such as radio waves. In addition, the flex circuit 812 provides power connections between the battery 816, or batteries, and other components. In addition to capacitive sensors 818*a-i*, FIG. 8A shows temperature sensors T1, T2 and T3. Sensors T1, T2, T3 are located close to capacitive pressure sensors 818*a-c* so that an individual temperature sensor may provide temperature for a specific capacitive sensor. In some examples a temperature sensor is provided for each pressure sensor 818*a-i*. In this way, the temperature for a particular capacitive sensor may be used to compensate for any temperature variation that might affect the physical or electrical behavior of the capacitive sensor. Temperature sensors T1, T2, T3 may be formed as part of the flex circuit 812 or may be separately formed and attached to the flex circuit 812.

Figure 8B:
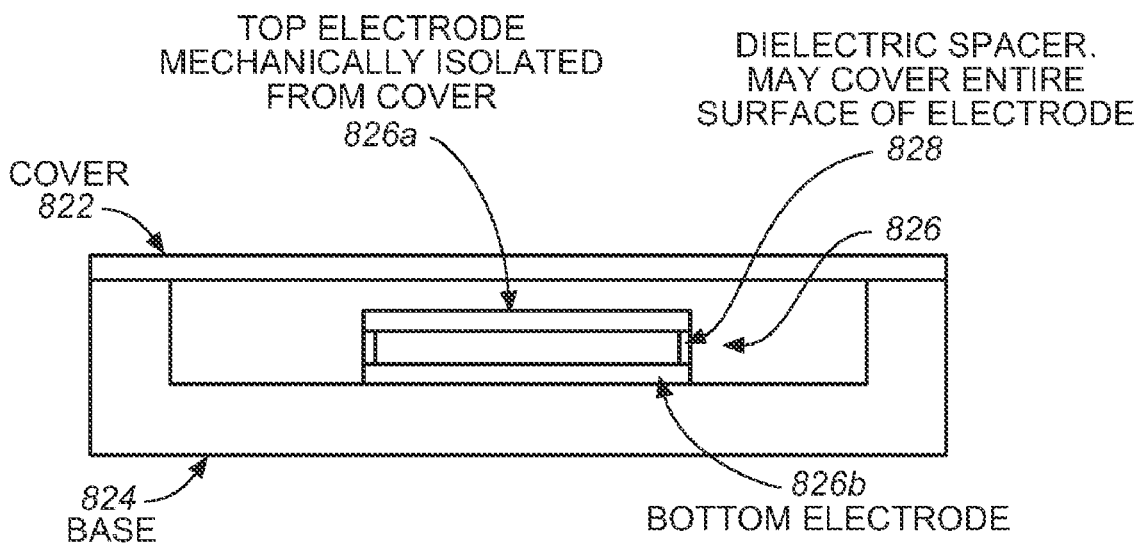
FIG. 8B is a side view of a plate with a base and a cover enclosing a cavity housing a pair of capacitively coupled electrodes not connected to the cover to sense a parasitic capacitance in the plate to illustrate another embodiment of the invention.

FIG. 8B is a side view of a member such as a plate with a base 824 and a cover 822 enclosing a cavity housing a pair 826 of capacitively coupled electrodes 826*a* and 826*b* not connected to the cover to sense a parasitic capacitance in the plate to illustrate another embodiment of the invention. Electrodes 826*a* and 826*b* are separated by a dielectric layer 828.

Figure 8C:
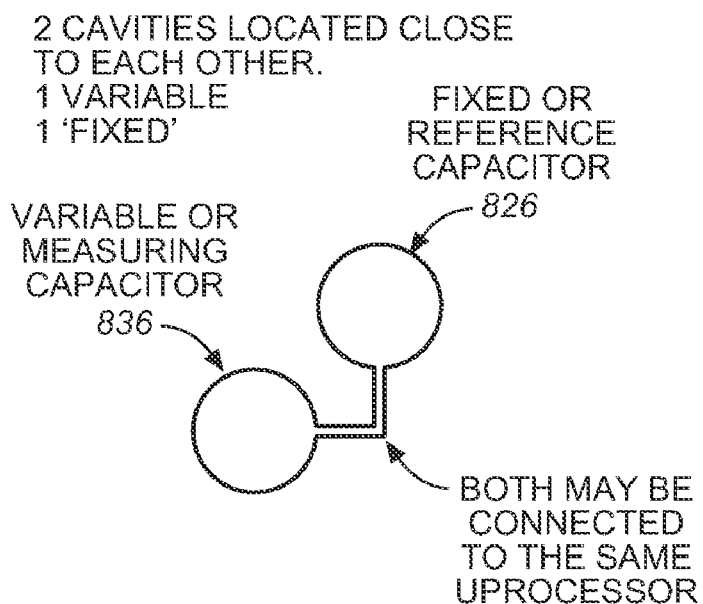
FIG. 8C is a top plan view of two pairs of capacitively coupled electrodes adjacent to one another, one pair not connected to the cover to sense a parasitic capacitance in the plate, and the other pair connected to the cover to sense a deflection of the cover.
Figure 9:
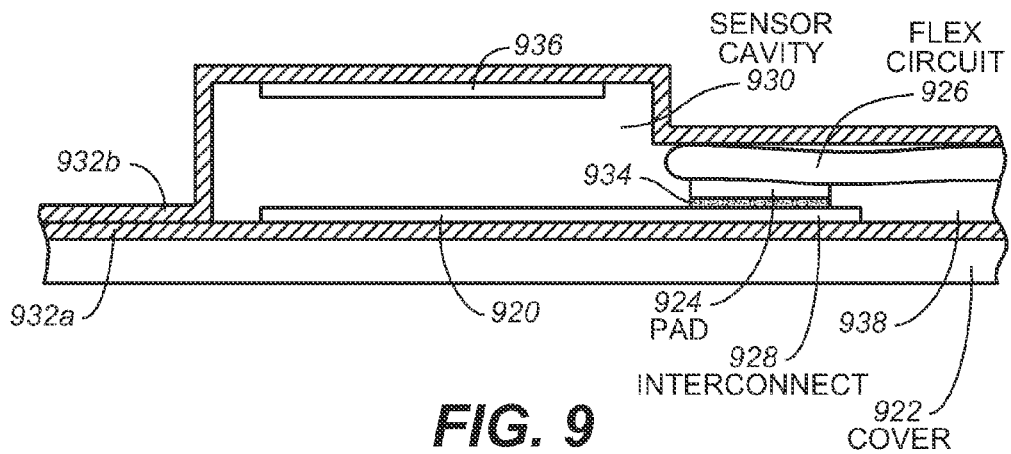
FIG. 9 shows a device that includes a flex circuit and a plate having a cavity that is covered by a diaphragm for measuring pressure or force, where the circuit is at least partially located in the cavity to illustrate another embodiment of the invention.

FIG. 8C is a top plan view of two pairs 826 and 836 of capacitively coupled electrodes adjacent to one another, one pair (826) not connected to the cover to sense a parasitic capacitance in the plate, and the other pair (836) connected (not shown in FIG. 8B) to the cover to sense a deflection of the cover. The capacitance of pair 826 is an indication of the parasitic capacitance experienced by pair 836. Thus, the capacitance of pair 826 may be used to adjust the measurement of the deflection of cover 822 by pair 836, so as to reduce the effect of the parasitic capacitance experienced by pair 836 on the measurement. This may be performed by microprocessor 814 in FIG. 8A, after the microprocessor 814 receives data related to the capacitances of pairs 826 and 836 through flex circuit 812 in FIG. 8A, and the change in capacitance of pair 836 caused by deflection of the cover 822.

Where electrodes are formed on the base and cover, these electrodes are connected to the flex circuit so that electronic circuits within the flex circuit can detect any capacitance change. Similarly, temperature or other sensors that are not formed integrally with the flex circuit are connected to the flex circuit. FIG. 9 shows an example where an electrode 920 on a cover 922 is connected to a pad 924 on a flex circuit 926. The electrode 920 is connected to an interconnect 928 that is outside the sensor cavity 930 (as shown in FIG. 5B). The interconnect 928 is isolated from the cover 922 by an insulating layer 932A on the cover 922. Pad 924 on the flex circuit 926 overlies the interconnect 928 and this pad is electrically connected to one or more integrated circuits in the flex circuit 926. The interconnect 928 is attached to the pad 924 by an electrically conductive epoxy 934. A similar connection (not shown) may be made to the base electrode 936. Similar connections may be formed for temperature sensors. Flex circuit 926 lies in trench 938 in this example. Thus, the electronics is partially in the cavity (the electrodes 920 and 936), and partially (flex circuit 926) in the trench 938 which can serve also as a reservoir to reduce the effect of deflection of the cover on the pressure measurement.

Figure 10:
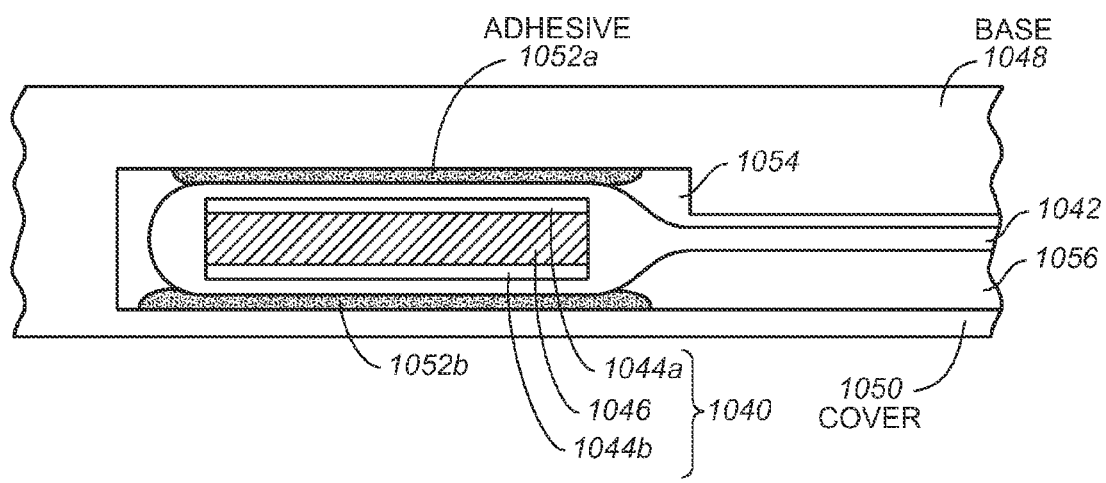
FIG. 10 shows another embodiment where a capacitive sensor is formed integrally with a flex circuit.

FIG. 10 shows another embodiment where a capacitive sensor is formed integrally with a flex circuit 1042. The flex circuit includes two electrodes 1044*a*, 1044*b* that are separated by a dielectric layer 1046 to form a capacitor 1040. The dielectric layer 1046 may be formed of a suitably compressible elastomeric material. The portion of the flex circuit 1042 that contains the capacitor is bonded to both the base 1048 and the cover 1050 using thin layers 1052*a*, 1052*b* of adhesive. Flex circuit 1042 lies in trench 1056.

In the examples of both FIGS. 9 and 10, trenches are provided for the flex circuits 926, 1042. Trenches 938, 1056 connect to the sensor cavities 930, 1054 respectively. Generally, a flex circuit does not fully occupy the flex circuit trench so that some unoccupied volume remains around the flex circuit. This extra volume allows for some gas flow through the trenches formed for the flex circuit. Also, some unoccupied volume generally remains around some integrated circuits of the flex circuit. Thus, the unoccupied volumes within the trenches and cavities formed for the flex circuit may form a reservoir system that reduces pressure variation within sensor cavities. A controlled opening from such a reservoir system to the exterior of the PCMD may be provided as previously described.

In one example, a flex circuit includes one or more capacitive sensors, or is attached to one or more capacitive sensors, and also includes electrical connections from the one or more sensors to an integrated circuit that provides an output that is dependent on the capacitance of the capacitive sensor. An example of an integrated circuit that may be used is an Analog Devices AD7746 capacitance to digital converter. This integrated circuit provides an output that may then be sent to a microprocessor for storage or transmission. In an alternative embodiment, capacitors connect directly to a microprocessor that performs a capacitance to digital conversion internally.

An alternative to using a capacitive sensor to measure pressure is to use a strain gauge. A sensor cavity may be formed according to any of the examples described above so that a diaphragm is formed that will deflect under pressure. Instead of placing capacitor electrodes on either side of this cavity, a strain gauge is placed so that it will be deflected as the diaphragm is deflected.

Figure 11:
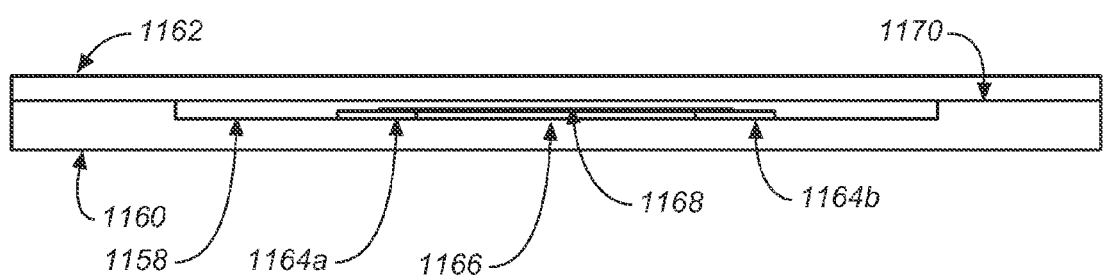
FIG. 11 shows an example where a sensor cavity is formed within a base. Spacers are placed under a strain gauge so that the strain gauge can deflect downwards. A deflection augmenting element is placed between the upper surface of the strain gauge and the cover.

FIG. 11 shows a first example where a sensor cavity 1158 is formed within a base 1160 (note that this drawing shows the cover 1162 above the base 1160, the opposite orientation to that of previous drawings and the opposite to the orientation during CMP). Spacers 1164a, 1164b are placed under a strain gauge 1166 so that the strain gauge 1166 can deflect downwards. A deflection augmenting element 1168 (such as a small bead, tube, corrugated structure or some other small rigid body) is placed between the upper surface of the strain gauge 1166 and the cover 1162. Thus, any deflection in the cover 1162 will cause the strain gauge 1166 to deflect. The deflection augmenting element 1168 causes a greater deflection in strain gauge 1166 than the deflection in cover 1162, thus augmenting the measurement obtained, which may increase resolution. In one example, a deflection augmenting element is machined into either a cover or a base. The strain gauge 1166 may be connected to electronic circuits in the base 1160 as previously described.

Figure 12A:
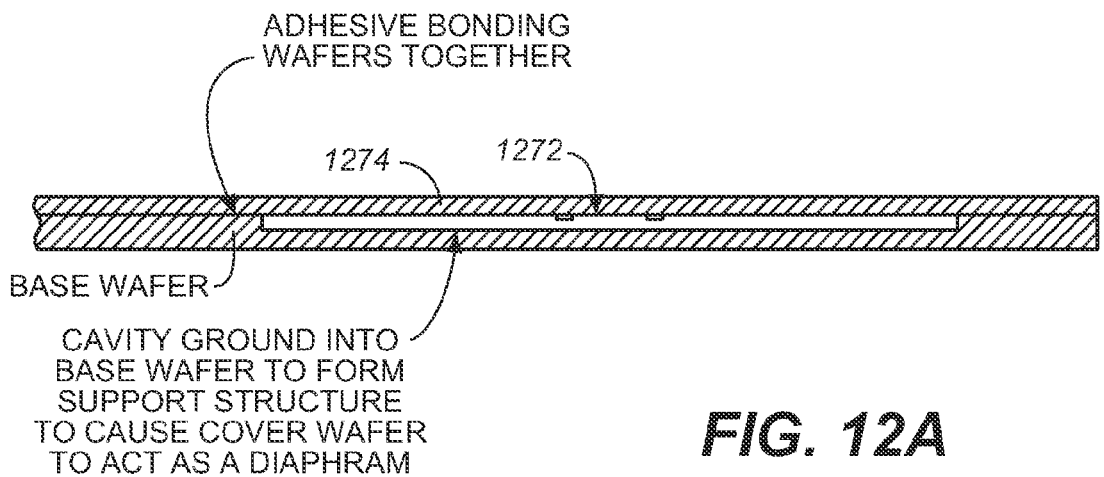
FIG. 12A shows an alternative arrangement where a strain gauge is bonded to a cover so that the strain gauge deflects along with the cover.

FIG. 12A shows an alternative arrangement where a strain gauge 1272 is bonded to a cover 1274 so that the strain gauge 1272 deflects along with the cover 1274. A suitable strain gauge may be a resistive strain gauge, a piezoresistive strain gauge, a piezoelectric strain gauge or a semiconductor strain gauge such as a bar gauge.

Figure 12B:
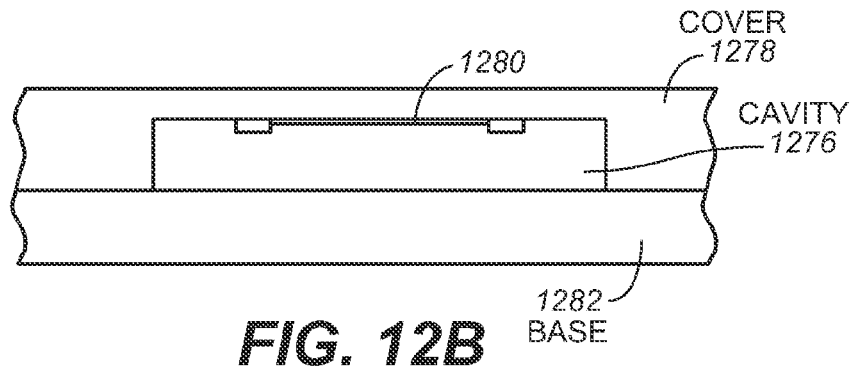
FIG. 12B shows an alternative embodiment to that of FIG. 12A.

FIG. 12B shows an alternative embodiment to that of FIG. 12A. Here a cavity 1276 is formed in cover 1278 and a strain gauge 1280 is formed on cover 1278. Base 1282 may be planar in this example.

Figure 13:
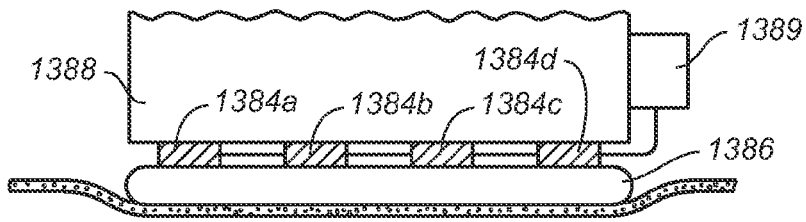
FIG. 13 shows an embodiment where pressure sensors are placed between a wafer and a CMP head.

FIG. 13 shows an embodiment where pressure sensors 1384a-d are placed between a wafer 1386 and a CMP head 1388. A production wafer may be used for wafer 1386 or a PCMD may be used instead. Pressure sensors may be capacitive sensors formed from two metal electrodes separated by a compressible dielectric. In one example, sensors 1384a-d are attached to wafer 1386. In another example, sensors 1384a-d are attached to the CMP head. In either case, sensors 1384a-d measure the pressure between the CMP head 1388 and wafer 1386 at various points on the wafer surface. Sensors 1384a-d are connected to electronics module 1388, which is mounted to CMP head 1388. Electronics module 1389 may store data from sensors 1384a-d, or may transmit the data in real time to another unit. For example, electronics module 1389 may include a Bluetooth or other wireless communication device to allow real time transmission of data.

In some cases, it may be desirable to calibrate a pressure measurement wafer (PCMD), either initially as part of a factory calibration or in the field. In some cases, the pressure readings from pressure sensors may change with use. For example, as a PCMD is subject to CMP, the thickness of a diaphragm is reduced, thus affecting pressure measurements based on the deflection of the diaphragm. One option is to coat a surface with a hard layer (for example, Silicon Nitride) to reduce erosion. However, such hard layer may have different characteristics to materials of production wafers. Another option is to deposit additional material periodically to replace material removed by CMP. This may be done at relatively low temperatures for some materials (e.g. Copper) but may require high temperatures for other materials (e.g. Silicon).

Figure 14:
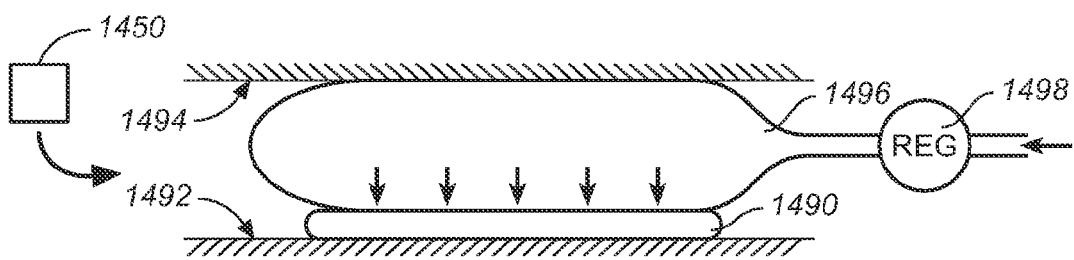
FIG. 14 shows a pressure calibration apparatus that may be used to calibrate a pressure sensing device.

FIG. 14 shows a pressure calibration apparatus that may be used to calibrate a pressure sensing PCMD as previously described. A PCMD 1490 is placed on a first surface 1492 with pressure sensors facing up. A second surface 1494 is located at a fixed distance above first surface 1492 and an inflatable bladder 1496 is placed between the PCMD 1490 and second surface 1494. Inflatable bladder 1496 is inflated to a predetermined pressure (or to a series of predetermined pressures) through pressure regulator 1498. Sensor readings may be recorded for each sensor at each predetermined pressure applied, and this data may be used to calibrate the sensor readings. A PCMD may be periodically calibrated in this manner to correct for removed material or other effects. Preferably, the pressure sensors are heated or cooled to predetermined temperatures by means of a temperature control instrument 1450.

Generally, a PCMD according to certain examples described above is used by placing it, with the cover side down, in a CMP processing system. The PCMD undergoes the same process that a production wafer goes through. During the process, the PCMD measures pressure at different locations across the lower surface. The data generated from such measurements is stored in a memory. After processing, the data is downloaded and analyzed to provide information about pressure across the PCMD as a function of time. Temperature data may be separately recorded. Temperature data may also be used to compensate pressure sensor reading for any temperature effects.

Various examples refer to CMP applications for a pressure sensing wafer or PCMD. However, such a pressure sensing wafer may be used in various other processes including processes that take place at pressures greater or less than atmospheric pressure. One example of a process that may be studied using a pressure sensing wafer is an immersion photolithography process, where pressure caused by an air knife (used to contain a water puddle) may be measured. Another process is CMP scrubbing or cleaning, a process that cleans a wafer after CMP. The pressure applied to the wafer during such a clean process may affect the cleanliness of the wafer. Certain processes hold a wafer to a chuck by electrostatic force. The force that such an electrostatic chuck (ESC) applies may vary over time and may be adjusted to prevent wafers from moving during processing. A pressure measuring PCMD may be used to measure the pressure between a wafer and such a chuck to determine the appropriate adjustment (if any). Substrates other than Silicon wafers may be instrumented to form a PCMD. For example, GaAs wafers or Flat Panel Display (FPD) substrates may be similarly provided with cavity based sensors.

In one embodiment, a PCMD has the same diameter as a 200 millimeter or 300 millimeter wafer and the same (or similar thickness). The PCMD includes at least one cavity that has a sensor to detect deflection into the cavity caused by external pressure. The PCMD may further include at least one temperature sensor. The PCMD may also include a flex circuit with at least one integrated circuit and conductors between the integrated circuit and sensors. The PCMD may also include at least one battery. A sensor to detect deflection in a cavity may be capacitance based or strain gauge based. A cavity may be connected to a dedicated reservoir or to a shared reservoir. A reservoir may be provided with an external opening.

In general, removal of material in CMP is caused by two mechanisms: mechanical action and chemical action. Although these mechanisms are closely linked, it may be desirable to try to separately measure parameters associated with each. One measurement that may be of particular value in measuring mechanical action is the frictional force between a wafer and a pad as the wafer moves with respect to the pad. Generally, mechanical abrasion of material increases with increasing frictional force. Frictional force may be used to provide a shear force in a structure that deforms in a manner that indicates the magnitude of the shear force. In general, greater frictional force provides greater mechanical action in removing material during CMP.

Figure 15:
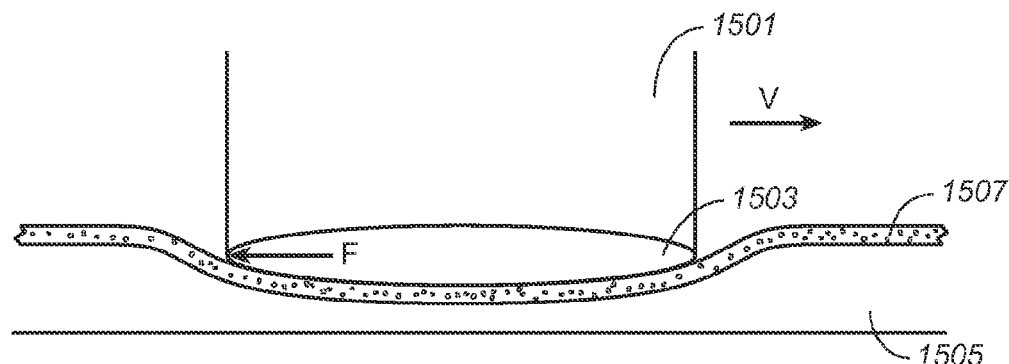
FIG. 15 shows a CMP head and an attached wafer moving with respect to a pad.

FIG. 15 shows a CMP head 1501 and an attached wafer 1503 moving with velocity V with respect to a pad 1505. A layer of slurry 1507 extends across pad 1505. As wafer 1503 moves horizontally, it is pressed into pad 1505 so that there is some pressure between wafer 1503 and pad 1505. As wafer 1503 moves to the right in FIG. 15, it experiences a frictional force opposing its motion, indicated by force F. Frictional force F generally depends on the coefficient of friction and also the normal force (pressure) between wafer 1503 and pad 1505. However, as discussed above, pressure is not always uniform across a wafer surface during CMP. Also, the velocity of relative motion between a wafer and a pad is not always constant across a wafer. A wafer may be rotated, resulting in a higher velocity for outer portions of the wafer than for inner portions. Also, the pad may rotate or otherwise move in a manner that does not provide uniform velocity across a wafer surface. It may be useful to measure frictional force at different locations across a wafer surface during CMP in order to estimate mechanical abrasion.

Figure 16A:
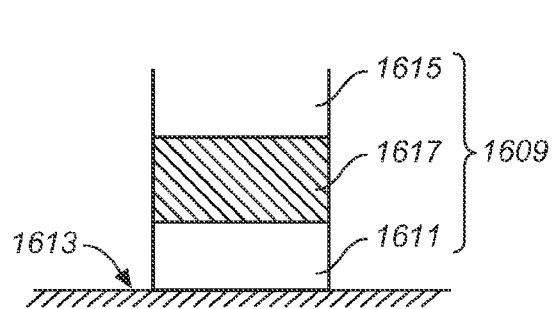
Figure 16B:
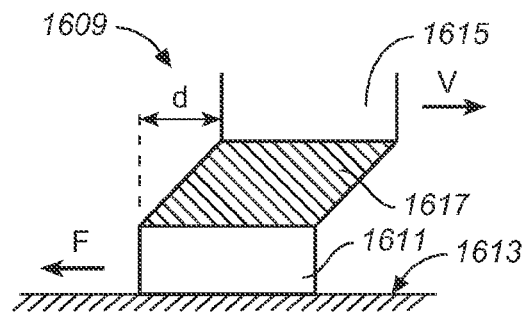
FIG. 16B shows the first rigid body of FIG. 16A in motion with respect to the surface and is moved by applying a force through the second rigid body. As a result of relative motion between first rigid body and the surface, a frictional force F is created, acting as a shear force causing portion of elastomeric material to deform.

FIGS. 16A and 16B illustrate the effect of shear force on a structure 1609 that is designed to deform under shear stress. FIG. 16A shows a first rigid body 1611 in contact with a surface 1613. First rigid body 1611 is connected to second rigid body 1615 by a portion of elastomeric material 1617. FIG. 16A shows structure 1609 at rest with respect to surface 1613. FIG. 16B shows structure 1609 in motion, having velocity V, with respect to surface 1613. Structure 1609 is moved by applying a force through second rigid body 1615. As a result of relative motion between first rigid body 1611 and surface 1613, a frictional force F is created. Frictional force F acts as a shear force causing portion of elastomeric material 1617 to deform. For example, elastomeric material 1617 may comprise a silicone elastomer with conductive elements dispersed therein, such as small flakes, platelets, fibers or nanotubes. In this case, the deformation causes an offset of d between first rigid body 1611 and second rigid body 1615 compared with their unloaded positions. The magnitude of d is a function of F. A shear force sensor may be formed from two rigid bodies that have a limited range of relative displacement under shear force and have some mechanism for measuring displacement. Preferably structure or member 1609 simulates a real work piece or substrate that is undergoing a CMP process. For this purpose, it is preferable for its surface in contact with surface 163 to have a coefficient of friction that is substantially the same as that of a real substrate, such as a semiconductor wafer or flat panel display panel. It is preferable for the structure 1609 to have dimensions that are substantially the same as those of a real substrate. The shear force is applied in a direction so that the force has at least one component that is perpendicular to the surfaces of structure 1609 and surface 1613.

Figure 17A:
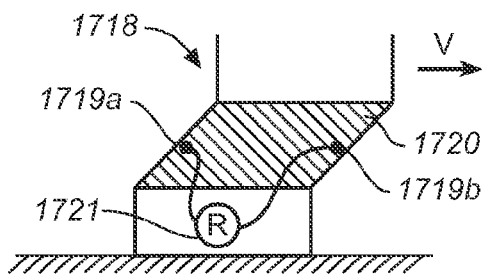
FIG. 17A shows a shear force sensor measuring deformation due to shear force on an elastomeric material through changes in the electrical properties of the elastomeric material as it is deformed.

In one example, shown in FIG. 17A, a shear force sensor 1718 measures deformation due to shear force on an elastomeric material through changes in the electrical properties of the elastomeric material as it is deformed. In particular, the electrical resistance of such an elastomeric material may change as the material is deformed. Electrodes may be provided to detect changes in the resistance of such an elastomeric material. FIG. 17A shows an example where electrodes 1719a, 1719b are embedded in an elastomeric layer 1720 and an electrical resistance measuring unit 1721 measures an electrical resistance (also referred to herein as simply "resistance", the two terms used interchangeably herein) between them. Some elastomeric materials may be formed with anisotropic electrical characteristics. A suitable elastomeric material with anisotropic electrical characteristics may comprise a silicone elastomer with conductive elements dispersed therein, such as small flakes, platelets, fibers or nanotubes. For example, such materials may be electrically conductive in one direction and nonconductive in another direction. Such materials may be formed so that a resistance changes with a deformation caused by shear (horizontal) force but is not significantly affected by a compressive (vertical) force. Electrodes for resistance measurement may be formed in the elastomeric material or on one or both surfaces on either side, for example as patterns of interdigitated fingers.

Figure 17B:
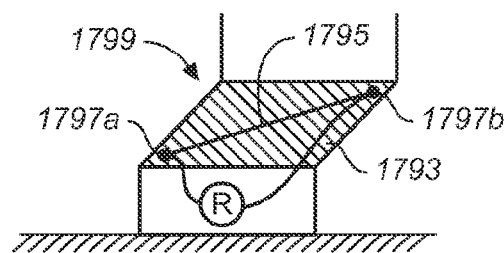
FIG. 17B shows an alternative shear force sensor where resistance is measured between two electrodes connected by a structure that varies in resistance as a result of shear induced deformation. In particular, the structure is arranged so that it elongates and deforms under shear force. The resistance of the structure changes as a result of such elongation.

FIG. 17B shows an alternative shear force sensor 1799 where resistance is measured by an electrical resistance measuring unit (not shown), such as unit 1721 of FIG. 17A, between electrodes 1797a, 1797b, which are connected by a structure 1795 that varies in resistance as a result of shear induced deformation. In particular, structure 1795 is arranged so that it runs diagonally through elastomeric layer 1793. Thus, structure 1795 elongates as elastomeric layer 1793 deforms under shear force. The resistance of structure 1795 changes as a result of such elongation. Structure 1795 may be formed of metallic platelets (e.g. Aluminum), carbon fibers, carbon black particles or similar small conductive bodies that form a conductive pathway. As the conductive pathway is stretched, conduction diminishes because of poor contact between conductive bodies. Structure 1795 is generally not sensitive to downward pressure.

In an alternative shear force sensor 1822, shown in FIG. 18, frictional force may be measured by allowing relative movement between two rigid bodies. A lower rigid body 1823 includes a protrusion 1825 that extends into a cavity 1827 in an upper rigid body 1829. The location of protrusion 1825 within cavity 1827 is established by springs or some other mechanism that allows some lateral movement when force is applied (e.g. elastomeric material). As lower rigid body 1823 moves across a surface 1831, a frictional force F is generated that tends to cause lower rigid body 1823 to move with respect to upper rigid body 1829. Such a relative movement may be observed as a change in distances d1, d2 between protrusion 1825 and walls of cavity 1827. Distances d1 and d2 may be measured by any suitable technique including capacitively or using piezoelectric material. Shear force may occur in any lateral direction, so a shear force sensor may detect displacement from a static condition in more than one direction. For example, shear force sensor 1822 may also measure distances perpendicular the cross section shown. Thus, both the magnitude and direction of shear force may be measured. FIG. 18 shows upper rigid body 1829 in contact with surface 1831. In other examples, such an upper rigid body may not have any contact with a surface and only the lower rigid body is in contact. Upper rigid body 1829 may be a base of a PCMD that includes electronic components that receive data from shear force sensor 1822.

A PCMD may measure frictional force using the structures described above. FIG. 19A shows a first example of a PCMD 1936 where a base 1933 and a cover 1935 are separated by an elastomeric layer 1937 that deforms as cover 1935 moves across a surface. In this case, a measurement is obtained for the entire PCMD 1936 indicating the total frictional force experienced. However, in some cases, it is desirable to obtain values for frictional force at different points on a wafer, or PCMD.

FIG. 19B shows a plan view of a PCMD 1938 having a lower surface consisting of concentric rigid bodies 1939*a-d* that are separated from a base (not shown) by an elastomeric material. Rigid bodies 1939*a-d* are physically separated from each other by small gaps so that rigid bodies 1939*a-d* can move separately with respect to a base. As PCMD 1938 rotates, frictional force is different for different rigid bodies 1939*a-d*. Electrodes attached to the elastomeric material connecting rigid bodies 1939*a-d* may be used to obtain separate resistance measurements to indicate the amount of frictional force experienced by different rigid bodies. In this way, instead of a single measurement of frictional force experienced by a PCMD, four different measurements are obtained, representing shear force experienced by four concentric zones of a wafer. Thus, PCMD 1938 may be considered to have four concentric shear force sensors.

In some cases, it may be desirable to obtain shear force measurements for zones having different angular displacements as well as different radial displacements. FIG. 20 illustrates how a wafer 2041 may move with respect to a pad 2043. Pad 2043 is a circular pad that rotates clockwise in this example by an instrument 2050, such as a motor in a conventional manner. Wafer 2041 rotates counter-clockwise and is moved laterally across pad 2043 by an instrument 2052 such as a motor and a gear mechanism in a conventional manner, which instrument may be one and the same as instrument 2050. The result of these different movements is that the speed with which a point on the wafer surface moves with respect to the pad beneath it changes as the wafer rotates. For example, as shown in FIG. 20 the right side of wafer 2041 experiences a higher speed with respect to the underlying portion of pad 2043 than the left side of wafer 2041. Thus, shear force for a particular location on the wafer surface may oscillate from low to high. Also, the shear force changes as wafer 2041 moves laterally across pad 2043. By measuring localized shear forces, additional information may be obtained, such as maximum and minimum shear forces and patterns in changing shear force.

FIG. 21A shows a PCMD 2147 that measures shear force at different radial and angular locations across a surface. FIG. 21A shows the bottom (cover) side of a PCMD 2147 similar to PCMD 1938 but with separate rigid bodies (separate shear force sensors) for different angular zones. Thus, instead of measuring average frictional force for different radial zones, PCMD 2147 measures frictional force for four different portions of each radial zone. This may provide maximum and minimum shear force information that may be useful.

FIG. 21B shows an alternative PCMD 2149 for measuring shear force at different locations on a surface. Whereas in earlier figures the shear force sensors on the lower surface of a PCMD occupied the entire lower surface (or nearly the entire lower surface), here shear force sensors 2151*a-i* occupy only a portion of the lower surface of PCMD 2149. Cut-outs are formed in a cover for shear force sensors 2151*a-i* with room to allow some displacement. PCMDs 1936, 1938, 2047 and 2149 may measure shear force using a shear force sensor such as sensors 1718 or 1799 that use elastomeric material, or a shear force sensor such as sensor 1822 that uses displacement, or using any other suitable shear force sensor. In general, one or more shear force sensors may be combined with other sensors in a PCMD. In particular, it may be desirable to include pressure sensors to measure compressive force, temperature sensors and material removal rate sensors for CMP applications. A microprocessor (not shown) similar to microprocessor 814 in FIG. 8A may be used to receive the data from the shear force sensors such as sensors 1718 and 1799, and data from other sensors through flex circuits of the type described above. Preferably such microprocessor includes a memory for storing data from the sensors, and/or transmitter circuits for transmitting such data to an external device, preferably by wireless transmission, such as radio waves.

In some PCMDs, sensors may collect acoustic input that is used to characterize a CMP process. For example, as a surface is eroded, a frequency of wafer vibration may change. This change may be detected by one or more acoustic sensors in the wafer or in a CMP head and used to obtain information regarding the amount of material removed. Thus, certain acoustic sensors may be considered removal rate sensors.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

Although the various aspects of the present invention have been described with respect to certain preferred embodiments, it is understood that the invention is entitled to protection within the full scope of the appended claims.

The invention claimed is:

1. A process condition measuring device for measuring shear force on a surface of a substrate that undergoes a polishing or planarization process, said device comprising:
   a member having a surface that has a property that is substantially the same as a property of the surface of the substrate, said member suitable for undergoing said process to simulate behavior of said substrate in the process; and
   at least one sensor attached to the member, wherein said at least one sensor measures a parameter related to a shear force on the surface of the member when such surface is in contact with and pressed against a polishing or planarization surface and a lateral force is applied between the polishing or planarization surface and the surface of the member.

2. The device of claim 1, wherein said property relates to a coefficient of friction of the surface of the member.

3. The device of claim 1, wherein said member has dimensions that are substantially similar to those of the substrate.

4. The device of claim 1, wherein said at least one sensor comprises a deformable body that deforms in response to the shear force on the surface of the member, said sensor measuring amount of deformation of the body.

5. The device of claim 4, wherein said at least one sensor further comprises a circuit that measures a change in an electrical parameter.

6. The device of claim 5, wherein said circuit measures a change in electrical resistance between two locations in said body.

7. The device of claim 5, wherein said circuit comprises a structure that varies in length and electrical resistance when said body is deformed, said circuit measuring a change in electrical resistance of said structure.

8. The device of claim 1, at least one sensor comprising two rigid bodies, wherein said lateral force causes displacement between the two rigid bodies and said at least one sensor measures said displacement.

9. The device of claim 1, wherein said member comprises a plurality of rigid bodies, each of plurality of rigid bodies having a surface that simulates a portion of the surface of the substrate in said polishing or planarization process, said at least one sensor comprises an elastomeric material with portions that separate corresponding ones of said plurality of rigid bodies from one another, and a plurality of circuits, each of said plurality of circuits measuring a change in a parameter related to deformation of one of said portions of said elastomeric material.

10. The device of claim 9, wherein said circuit measures a change in electrical resistance between two locations in said body.

11. The device of claim 9, said plurality of rigid bodies comprising a plurality of concentric rigid bodies.

12. The device of claim 11, wherein cross-sections of at least some of said plurality of rigid bodies have angular zones.

13. The device of claim 1, said member comprising a cover and a base, said base defining therein a plurality of cut-outs therein, said cut-outs distributed across a surface of said cover, said device farther comprising a plurality of sensors in the cut-outs for sensing shear forces on said sensors when the surface of said cover is in contact with and pressed against said polishing or planarization surface and said lateral force is applied between the polishing or planarization surface and the surface of the cover.

14. The device of claim 1, wherein said process causes a first motion of said polishing or planarization surface, said device further comprising an instrument causing a second motion of the surface of the member, said first and second motions being in different directions.

15. The device of claim 14, wherein said first and second motions are rotational motions.

16. A method for measuring shear force on a surface of a substrate that undergoes a polishing or planarization process; said method comprising:
providing a member having a surface that has a property that is substantially the same as a property of the surface of the substrate, said member suitable for undergoing said process to simulate behavior of said substrate in the process;
pressing the surface of the member against a polishing or planarization surface;
applying a lateral force between the polishing or planarization surface and the surface of the member;
and measuring a parameter related to a shear force on the surface of the member.

17. The method of claim 16, wherein said measuring measures said parameter at a plurality of different locations across the surface of said member substantially simultaneously.

18. The method of claim 16, said process causing a first motion of said polishing or planarization surface, said method further comprising causing a second motion of the surface of the member, said first and second motions being different.

19. The method of claim 18, said first and second motions being in different directions.

20. The method of claim 18, wherein said first and second motions are rotational motions.

21. A process condition measuring device comprising:
a member having a surface that has a property that is substantially the same as a property of the surface of the substrate, said member suitable for undergoing said process to simulate behavior of said substrate in the process;
at least one shear force sensor attached to the member; and
an electronic circuit attached to the member, the electronic circuit comprising a memory or a wireless transmission component, the electronic circuit receiving data from the shear force or pressure sensor and storing the data in the memory or transmitting the data using the wireless transmission component.

* * * * *